(12) United States Patent
Durante et al.

(10) Patent No.: US 7,250,387 B2
(45) Date of Patent: Jul. 31, 2007

(54) FILTER SYSTEM

(75) Inventors: Vincent Durante, West Chester, PA (US); Dean Gambale, Wilmington, DE (US); Richard Gebert, Elkton, MD (US); Marc Plinke, Kingsport, TN (US); Steve Stark, Wilmington, DE (US); Richard A. Bucher, Lincoln University, PA (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 11/335,967

(22) Filed: Jan. 20, 2006

(65) Prior Publication Data

US 2006/0116287 A1  Jun. 1, 2006

Related U.S. Application Data

(60) Continuation of application No. 11/014,083, filed on Dec. 15, 2004, now abandoned, which is a division of application No. 10/272,487, filed on Oct. 16, 2002, now abandoned.

(51) Int. Cl.
*B01J 20/22* (2006.01)
(52) U.S. Cl. ..................................... 502/401
(58) Field of Classification Search ................ 502/401, 502/215, 208, 216, 175, 224
See application file for complete search history.

(56) References Cited

U.S. PATENT DOCUMENTS

| | | | |
|---|---|---|---|
| 3,875,287 A | 4/1975 | Kurikami | 423/101 |
| 3,876,393 A | 4/1975 | Kasai et al. | 55/68 |
| 3,953,566 A | 4/1976 | Gore | 264/288 |
| 4,220,633 A | 9/1980 | Pirsh | 423/239 |
| 4,309,386 A | 1/1982 | Pirsh | 422/177 |
| 4,363,720 A | 12/1982 | Hirschberg et al. | 502/53 |
| 4,732,879 A | 3/1988 | Kalinowski et al. | 502/5 |
| 5,051,391 A | 9/1991 | Tomisawa et al. | 502/242 |
| 5,476,589 A | 12/1995 | Bacino | 210/500.36 |
| 5,512,526 A | 4/1996 | Greco | 502/80 |
| 5,620,669 A | 4/1997 | Plinke et al. | 422/177 |
| 5,814,405 A | 9/1998 | Branca et al. | 428/311.51 |
| 5,834,114 A | 11/1998 | Economy et al. | 428/368 |
| 5,938,818 A | 8/1999 | Miller | 95/63 |
| 5,972,525 A | 10/1999 | Mori et al. | 428/632 |
| 6,074,975 A | 6/2000 | Yao et al. | 502/64 |

FOREIGN PATENT DOCUMENTS

| | | |
|---|---|---|
| DE | 3633214 A1 | 3/1988 |
| JP | 4-219124 | 8/1992 |
| JP | 8-196830 | 8/1996 |
| JP | 10-109016 | 4/1998 |
| WO | WO 01/21284 A1 | 3/2001 |

*Primary Examiner*—Edward M. Johnson
(74) *Attorney, Agent, or Firm*—E. Alan Uebler, P.A.

(57) ABSTRACT

The present invention is an improved filtration system, filtering method and unique chemical composition for capturing mercury and other pollutants in flue gases generated by process gas streams. The improved filtration system may take various forms depending on the type of filter system most desired for a particular application; however, the filter system includes at least a filter element or elements and an adsorbent component having a composition suitable for capturing mercury on the downstream side of the filter element.

4 Claims, 8 Drawing Sheets

FILTER SYSTEM

RELATED APPLICATIONS

The present application is a continuation application of U.S. patent application Ser. No. 11/014,083, filed Dec. 15, 2004 now abandoned, which is a divisional of U.S. patent application Ser. No. 10/272,487, filed Oct. 16, 2002 now abandoned.

FIELD OF THE INVENTION

The present invention is an improved filter system and components thereof for both collecting particulates and adsorbing chemical pollutants from process gas streams. More particularly, the filter system of the present invention is highly effective for removing pollutants such as gaseous and solid elemental mercury and its compounds, as well as other chemical pollutants, and for collecting particulates under a range of process gas stream conditions.

BACKGROUND OF THE INVENTION

Figure 1:
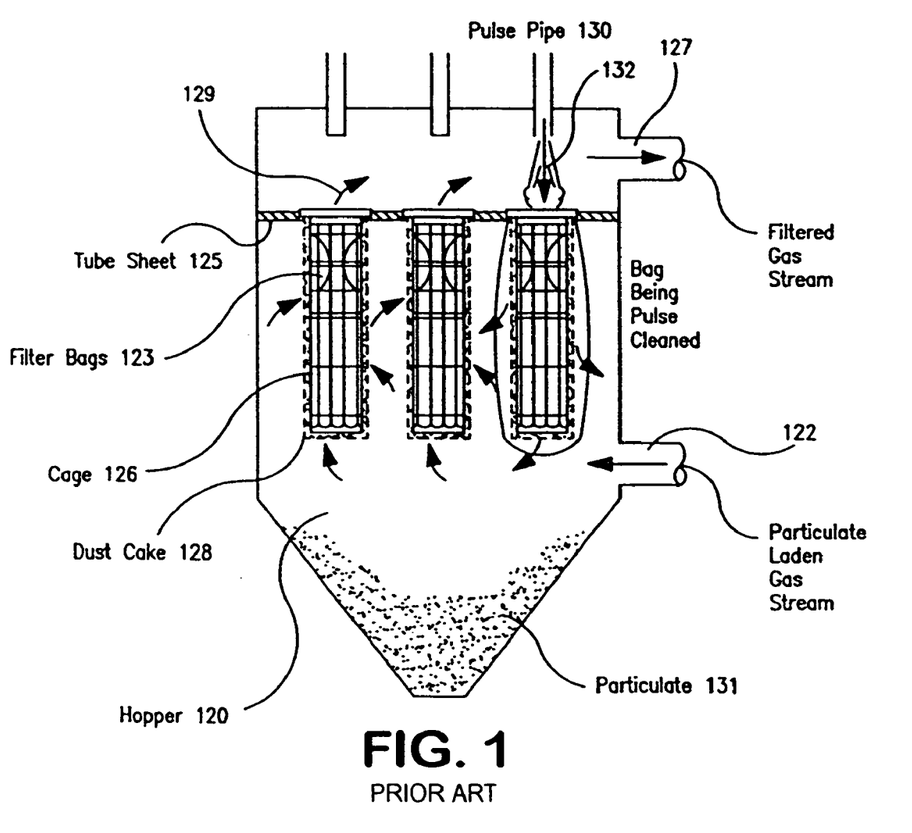
FIG. 1 is a schematic picture of a conventional filter baghouse operation.

The removal of particulates from a gas stream has long been a practice in a variety of industrial fields. Conventional means for filtering particulates and the like from gas streams include, but are not limited to, filter bags, filter tubes, filter cartridges and filter panels. These filter elements are typically oriented into a filtration system, often referred to as a filter baghouse, for filtering such particulates. Such filtration systems may be either cleanable or non-cleanable, depending on the requirements of the system operation. Referring to FIG. 1, there is shown one non-limiting example of a conventional filtration system, in this case a pulse jet cleaning system and sequence is shown. Inside hopper 120, the particulate laden gas stream 121 enters the hopper at inlet 122 and passes through filter bag 123. Tube sheet 125 inside hopper 120 prevents the gas stream from bypassing the filter bag. The filter bag 123 is kept open by support cage 126. The gas stream, after passing through the bag and out bag exit 129, exits the clean air compartment at outlet 127. In operation, particulate forms a dust cake 128 on the outside of the filter bag, as shown in the bag on the left of the figure. On cleaning to remove the filter cake, air from pulse pipe 130 enters the bag. This pulse of air 132 expands the bag, loosening the dust cake and thus causing particulate 131 to collect at the bottom of the hopper 120. As seen in the bag on the right of the figure, the pulse jet causes the filter bag to expand.

Activated carbon powders have been used for the capture of toxic contaminants such as mercury in flue gas streams emanating from utility boilers, hazardous or municipal waste incinerators, crematoria and the like. Typically, activated carbon powder is fed, or "injected," into a flue gas stream upstream of a particulate collection device. One example of such an activated carbon capture system is described in the article entitled Full-Scale Evaluation of Sorbent Injection for Mercury Control on Coal Fired Power Plants by Bustard et al, In Proceedings of Air Quality III: Mercury, Trace Elements and Particulate Matter Conference; Arlington, Va., Sep. 9-12, 2002. This publication teaches that activated carbon powder, can be introduced upstream of a filter bag dust collector (e.g., a baghouse) to adsorb or react with the mercury in the gas stream, then the adsorbed or reacted mercury is collected on the surface of the filter bag or bags.

The problem of the capture and immobilization of gaseous mercury and its compounds has been considered previously. For example, continuous injection of powdered activated carbon (PAC) into the flue-gas train upstream of an electrostatic precipitator or fabric filter has been used to control mercury emissions in the municipal waste combustor industry and has been proposed as a control technology for the coal-fired utility industry in the United States. [John H. Pavlish et. al., "Status Review of Mercury Control Options for Coal-Fired Power Plants", *Fuel Processing Technology*, in press (2002), and references therein] Disadvantages of this approach include the need for large volumes of carbon to adsorb mercury to proposed regulatory levels due to the short contact time of the adsorbent carbon in contact with mercury vapor and the low capacity for mercury adsorption by PAC at temperatures above about 130° C. In addition, the requisite C/Hg injection ratios necessitate large volumes of injected carbon that can result in considerable contamination of the fly ash produced in coal-fired utility boilers. Carbon contamination often reduces the commercial value of the ash as an additive for concrete.

Various treatments of PAC with sulfur compounds or elemental iodine to improve equilibrium adsorption capacity or capture efficiency for mercury have been investigated and disclosed. The better performers among these known in the art have been summarized by Pavlish, referenced above. For example, U.S. Pat. No. 3,876,393 discloses the passing of mercury-containing vapors over activated carbon that has been impregnated with sulfuric acid. Unexamined Japanese Patent Application (Kokai) No. 10-109016 (Babcock Hitachi KK) teaches that activated carbon powder, or another component having a large specific surface, treated with a $ZnI_2$ active component can be introduced via a carbon injection system to remove mercury in a flue gas stream.

Disadvantages associated with the use of such systems include expensive injection systems, limited collection efficiencies, particularly at high temperatures (i.e., above 130° C.), and carbon-contaminated fly ash that may require handling as hazardous waste. Initial testing with a Powder River Basin (PRB) ash determined that the presence of even trace amounts of activated carbon in the recovered ash rendered the material unacceptable for use in concrete (Bustard et al).

The use of activated carbon fiber filters for mercury capture is described in Journal of the Air & Waste Management Association, Vol. 50, June 2000, pages 922-929. It is taught that activated carbon fibers can be woven or felted and used in a bag filter configuration where particulate matter and elemental mercury could be captured. However, the adsorptive capacity reported in this work (52.5 micrograms Hg/gram activated carbon) is too low to allow this to be used as a bag filter or fixed bed in place of carbon injection. Furthermore, a bag filter made from activated carbon fibers will trap fly ash particles within the depth of the fiber structure, causing a steep increase in pressure drop over time, and the cleanability of such bags is very limited.

It is known to incorporate catalytic and adsorbent particles into filter elements to react with and/or adsorb components from a gas stream. In U.S. Pat. Nos. 4,220,633 and 4,309,386, to Pirsh, filter bags are coated with a suitable catalyst to facilitate the catalytic reduction process of $NO_x$. In U.S. Pat. No. 5,051,391, to Tomisawa et al., a catalyst filter is disclosed which is characterized in that catalyst particles which are made of metal oxides with a diameter of between 0.01 to 1 um are carried by a filter and/or a catalyst fiber. In U.S. Pat. No. 4,732,879, to Kalinowski et al., a method is described in which porous, preferably catalytically active, metal oxide coatings are applied to relatively non-porous substrates in a fibrous form. In patent DE 3,633,214 A1, to Ranly, catalyst powder is incorporated into multilayered filter bags by inserting the catalyst into the layers of the filter material. Further examples to produce catalytic filter devices include those set forth in JP 8-196830, to Fujita et al., in which a micropowder of an adsorbent, reactant, or the like is supported in a filter layer interior. In JP 4-219124, to Sakanaya et al., a compact, thick, and highly breathable filter cloth is filled with catalyst for the bag filter material in order to prevent catalyst separation. In U.S. Pat. No. 5,620,669, to Plinke et al., the filter comprises composite fibers of expanded polytetrafluoroethylene (ePTFE) having a node and fibril structure, wherein catalyst particles are tethered within the structure. PCT Publication No. PCT/US00/25776, in the name of Waters et al., is directed to filters comprising active particles that are adhered to a porous woven or non-woven substrate by a polymer adhesive, and optionally adjacent or within the substrate is at least one protective microporous layer. However, none of these references discloses or suggests the removal of mercury from a flue gas stream or appropriate chemical composition for effective mercury removal. Moreover, none of these references teaches the removal of particulate and mercury contaminants from a flue gas stream wherein the fly ash particulate is collected at a first location and the mercury is collected downstream of the particulate to minimize or prevent carbon contamination of the particulate fly ash.

An approach to oxidize mercury catalytically to an ionic form that could be removed in a subsequent, downstream wet-flue-gas-desulfurization unit operation (WFGD) was reported by Blythe et al. in "Catalytic Oxidation of Mercury in Flue Gas for Enhanced Removal in Wet FGD Systems". Promising catalysts were evaluated in packed bed configurations for their abilities to generate a soluble mercury species. The authors anticipated the eventual incorporation of these catalysts into a honeycomb catalytic oxidizer located in the flue-gas train of coal-fired utility boilers immediately after an ESP dust removal unit. Blythe et. al. expected that locating the catalytic oxidizer monolith after the ESP would alleviate high pressure drop caused by fly ash plugging, as had been a concern during their packed bed tests. Although they envisioned the removal of mercury downstream of the point of oxidation and of fly ash removal, their concept requires the installation of a separate unit operation facility with a separate footprint. Furthermore, mercury is recovered in a relatively dilute liquid phase that might require further treatment to concentrate the mercury.

A need clearly exists for an improved filtration system which effectively removes mercury in any oxidation state from flue gases at elevated process temperatures (i.e., >130° C.) without the creation of voluminous byproducts or waste streams. In addition, a need exists for such a system which could be readily retrofit into existing filter systems without significant and expensive modifications to such existing filter systems. A further need exists for a mercury filtration system which provides extended on-line operational capability and less maintenance compared to at least carbon injection systems. Another important need exists for the capability of a single filtration system to provide multi-pollutant control (i.e. particulate, NOx, dioxins, furans, and mercury).

These and other purposes of the present invention will become evident based upon a review of the following specification.

SUMMARY OF THE INVENTION

The present invention is an improved filtration system, filtering method and unique chemical composition for capturing mercury and other pollutants in flue gases generated by process gas streams. The improved filtration system may take various forms depending on the type of filter system most desired for a particular application; however, the invention includes at least a filter element or elements and an adsorbent component having a composition suitable for capturing mercury on the downstream side of the filter element.

Filter elements and systems suitable to the present invention include either conventional (i.e., non-membrane) or membrane filter bags, cartridges, panels, and the like, whether in a baghouse or other filtration assembly.

The adsorbent component of the invention is one with a unique chemical composition which is capable of capturing mercury (Hg) under the operating conditions of the filter system employed. In a preferred embodiment, the adsorbent component provides a mercury capture capacity exceeding at least 4 mg Hg per gram, more preferably exceeding at least 10 mg Hg per gram, and most preferably exceeding at least 20 mg Hg per gram of initial dry weight of adsorbent as determined by the Mercury Capture Efficiency and Capacity Test, described in more detail herein. The adsorbent component comprises an air-permeable high surface area support, a mercury binding agent and a promoter. Suitable high surface area support materials are those which display a BET (Brunner Emmett Teller) surface area of at least about 50 $m^2g^{-1}$, more preferably at least 85 $m^2g^{-1}$, and most preferably at least 300 $m^2g^{-1}$ using nitrogen as adsorbate after pretreatment between 100-200° C. for at least 2 hours under dynamic vacuum. Activated carbon is just one example of an appropriate support material.

Suitable mercury binding agents may include anions or salts selected from halides, thiocyanates, sulfides, polysulfides, selenium, tellurium and phosphorus compounds. Particularly, the binding agent comprising at least one binding compound having a component selected from the group consisting of an anion of a halide, an anion of a thiocyanate, an anion of a sulfide, an anion of a polysulfide, an anion of selenium, an oxyanion of selenium, an anion of tellurium, an oxyanion of tellurium, an anion of phosphorus, and an oxyanion of phosphorus. Preferred binding agents are selected from the group of potassium iodide, copper iodide, zinc iodide and copper thiocyanate.

The promoter functions to increase adsorption capacity (MCC40 according to the test defined herein), to reduce volatility of binding agents, and to generate anchoring sites on the high surface area support for bonding to the mercury-binding-agent complex. Suitable promoters include compounds having at least one of a multivalent metallic cation and a multivalent metalloid cation that is not spontaneously reduced by iodide, i.e. with a standard aqueous reduction potential Emf value at 25° C. less than (more negative than) −0.56 volts, when expressed as a two electron half-reaction written as a reduction as tabulated in *The CRC Handbook of Chemistry and Physics*, 67$^{th}$ edition, R. C. Weast, ed., CRC Press, Boca Raton, 1986, pp. D-151-D-158. Preferred promoters comprise carboxylate salts of Zn (II) or Mg (II). A particularly preferred combination of binding agent and promoter comprises potassium iodide as the binding agent and zinc acetate hydrate as the promoter. Trivalent or quadrivalent metallic or metalloid cations that meet the reduction potential criterion above are suitable for use. It is understood that after exposure to heating during preparation or use of the mercury-trapping filter, the nature of the binding agent or the promoter compounds may be altered. The acceptable or optimal ratios of binding agent to promoter vary depending on the specific combinations of ingredients used, but follow these general guidelines: acceptable compositions include molar ratios of mercury-binding-anion to promoter-cation ranging from 1000 to 0.05. Preferred molar ratios range from about 100 to about 2. Most preferred molar ratios range from about 5 to about 3.

The improved filtration system of the present invention, in a first embodiment, comprises a filtration system including one or more conventional or membrane filter elements (e.g., bags, cartridges, etc.) which incorporate a permanent or replaceable adsorbent insert on the downstream side of the filter element. Particulate filtration occurs on the upstream side of the filter element, and mercury removal occurs on the downstream of the filter element as the flue gas passes through the insert. The adsorbent insert comprises a suitable air-permeable high surface area support having thereon a mercury binder/promoter as described above. The adsorbent insert of the invention may be flexible or rigid. Examples of flexible inserts include woven or felted materials imbibed with activated carbon particles having the mercury binding agent/promoter thereon or even activated carbon fibers woven or felted into a flexible sheet having the mercury binding agent/promoter thereon. An example of a suitable rigid activated carbon insert material is a carbonized resin, such as that described in U.S. Pat. No. 5,834,114, to Economy et al. The insert may have any desired geometry such as a flat disk or panel, a sleeve or tube, a hub-and-spoke geometry, canister or the like, provided the insert fits into the filter element or is somehow attached to the downstream side of the filter element. The air permeability of an adsorbent insert having thereon a mercury binder/promoter should preferably have a Frazier number greater than 20, more preferably greater than 30 and most preferably greater than 40. In the filter system where the activated carbon insert component is installed inside a filter element, the air permeability of the combined layers should have a Frazier number greater than 1, preferably greater than 2. Depending on the desired pollutants to be adsorbed, multiple inserts, or inserts with multiple layers may be incorporated in the improved filter systems of the present invention. A particular benefit of such an insert construction is that the insert may be easily inserted into or attached to conventional or membrane filter elements to allow retrofitting of existing filtration systems.

In a second embodiment of the invention, the adsorbent component is located in a layer of the filter element, such as in the filter layer or, more preferably, in a backer layer of the filter element. In this case, the flue gas to be filtered contacts the upstream side of the filter element and particulate filtration is achieved, either by depth filtration for conventional (i.e., non-membrane) filter elements or by surface filtration for membrane filter elements. The mercury-containing flue gas, which has been filtered of particulate, then contacts the adsorbent component of the filter element to achieve mercury removal from the flue gas. The filter element may comprise, for example, a felt or fabric imbibed or otherwise filled with the adsorbent component, either with or without a membrane filter layer. In a preferred embodiment, the filter system comprises a filter element of a felted or woven backer material incorporating the mercury adsorbent component and laminated to a membrane filter layer, most preferably comprising expanded PTFE. The backer material incorporating the adsorbent component preferably should have an air permeability Frazier Number greater than 10, and more preferably greater than 20. In the filter element where the adsorbent component is laminated to a membrane filter layer, the combined layers should have an air permeability Frazier Number greater than 1, preferably greater than 2. In a further embodiment, the filter incorporates additional functionality for removing or catalyzing other species present in the gas stream, whether in a single backer layer or in multiple backer layers. One example of a filter material which includes added functionality is described in U.S. Pat. No. 5,620,669, to Plinke et al., wherein the filter comprises fibers of expanded polytetrafluoroethylene (ePTFE) having a node and fibril structure, and catalyst particles are tethered within the structure. Another example of a structure incorporating additional functionality is one constructed in accordance with PCT Publication No. PCT/US00/25776, described earlier, whereby an expanded PTFE membrane filter layer may be laminated to a backer imbibed with both the mercury adsorbent component and active catalytic particles.

In a third embodiment of the invention, the filtration system comprises a separate filter component incorporating the mercury removal adsorbent component located downstream of the particulate filter element, such as in the case of a downstream filter array incorporating the binding agent and promoter. Suitable separate downstream filter arrays may include panel or pleated filter constructions, cartridges, or the like.

Particular benefits of the present invention include providing a high efficiency of mercury removal during operation and collecting the particulate and fly ash by the filter element upstream of the mercury capture, thus reducing or eliminating contamination of the fly ash, which is a significant problem with carbon injection systems. Another benefit includes the ability to easily and cost-effectively retrofit existing filter systems for mercury control. A further benefit is the capability of a single filtration system to provide multi-pollutant control, including particulate, NOx dioxins, furans, and mercury capture in a single system.

BRIEF DESCRIPTION OF THE DRAWINGS

The operation of the present invention should become apparent from the following description when considered in conjunction with the accompanying drawings, in which.

DETAILED DESCRIPTION OF THE INVENTION

As noted, the present invention is an improved filtration system, filtering method and unique chemical composition for capturing mercury and other pollutants in flue gases generated by process gas streams.

The improved filtration system may take various forms depending on the type of filter system most desired for a particular application; however, the invention includes at least a filter element or elements and an adsorbent component having a composition suitable for capturing mercury on the downstream side of the filter element.

Figure 2:
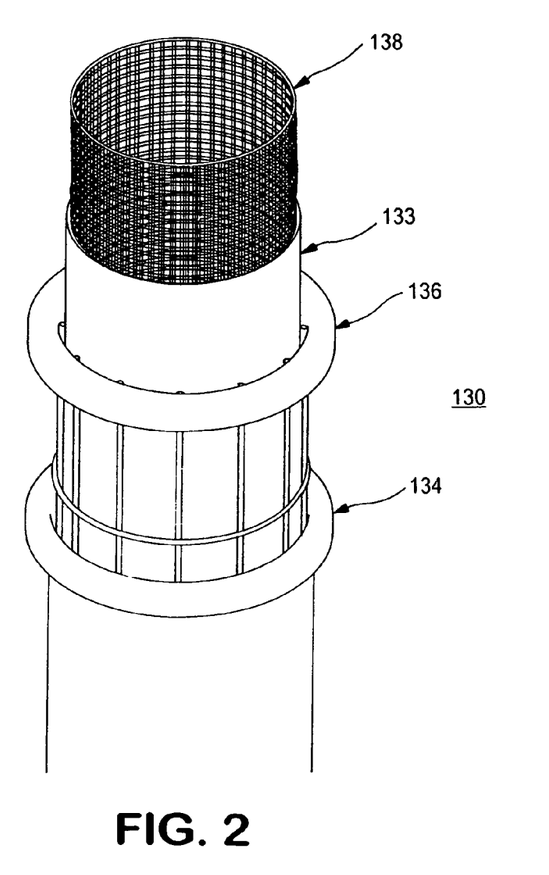
FIG. 2 is perspective extended view of an embodiment of the present invention comprising a filter element incorporating an insert.

Referring to FIG. 2, there is shown an exemplary embodiment of a filter element 130 incorporating an adsorbent insert 133 in accordance with the present invention. Particularly, there is shown a filter bag 134 supported by a filter bag cage 136 and an adsorbent insert 133 located inside the filter bag cage 136. In this embodiment, the insert 133 has a sleeve or tubular geometry and is supported by an insert cage 138. Insert cage 138 is an optional component and is most preferably utilized when a flexible insert is used. In the case of a construction where a relatively more rigid, self-supporting insert is provided, no insert cage would be necessary.

Figure 3A:
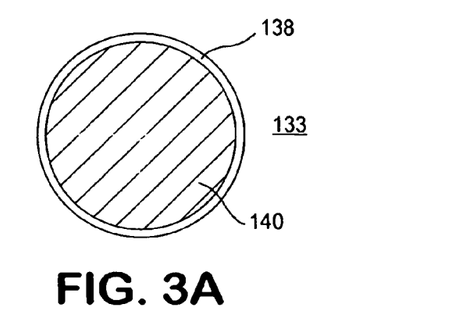
FIGS. 3A-E are perspective views of alternative adsorbent inserts of the present invention.
Figure 3B:
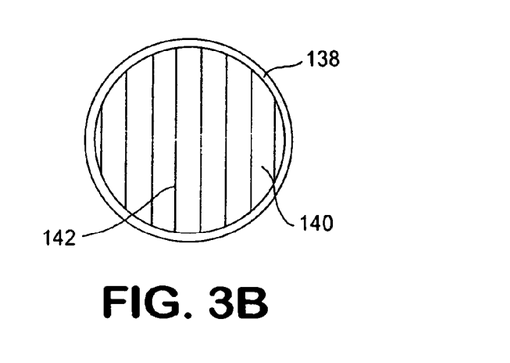
Figure 3C:
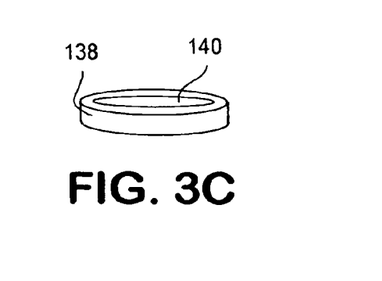
Figure 3D:
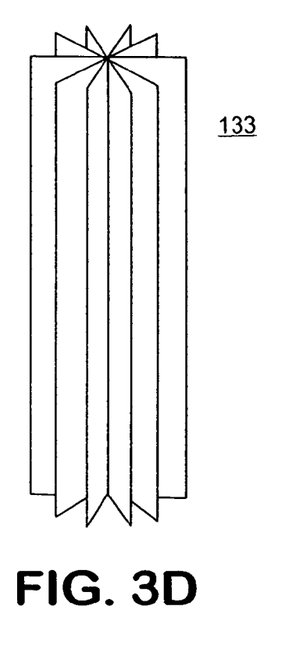
Figure 3E:
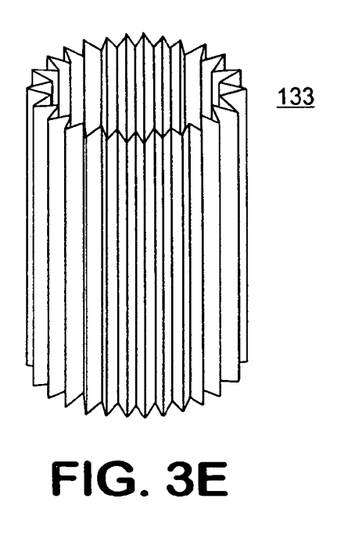
Figure 3F:
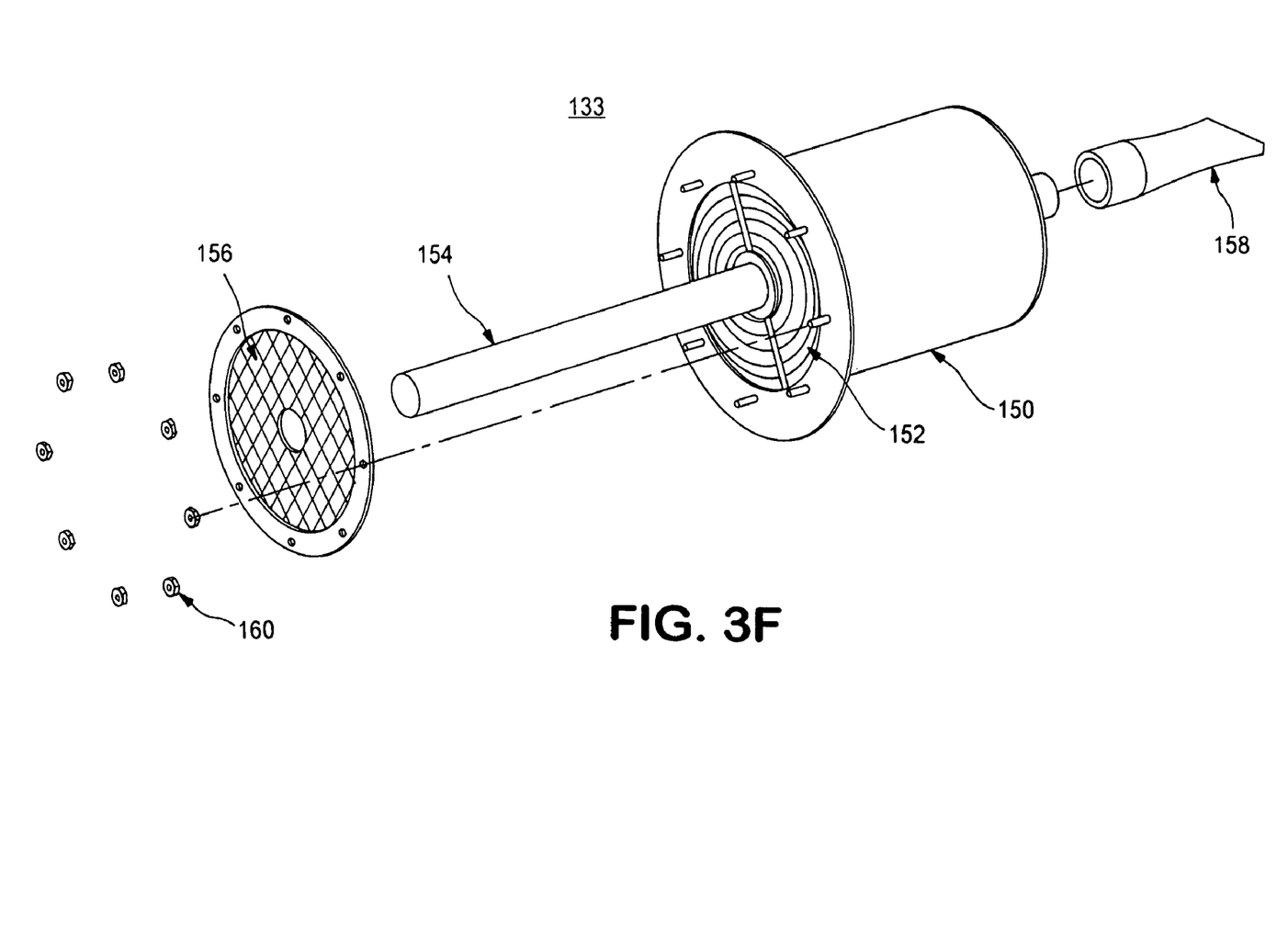
FIG. 3F is a partially expanded perspective view of a further alternative adsorbent insert of the present invention.

FIGS. 3A, 3B and 3C show an alternative construction comprising a panel adsorbent insert for a filter element, wherein the insert 133 comprises a frame or housing 138 holding an adsorbent component media 140. The media 140 may be either flat as shown in FIG. 3A or may incorporate pleats 142, as shown in FIG. 3B. FIG. 3C shows a side perspective view of the insert 133. One or more inserts may be positioned in or attached to the filter element by any suitable means in a downstream orientation, as described above. FIGS. 3D and 3E show further hub-and-spoke and pleated geometries, respectively, for the suitable filter inserts 133 which may be incorporated with the filter element in the present invention. FIG. 3F shoes a further alternate configuration of a suitable insert 133 of the present invention, wherein the insert 133 comprises a canister filter configured for a pulse jet cleaning filtration system. Specifically, a canister housing 150 is provided for housing a coiled or otherwise configured adsorbent component media 152, and a pulse pipe 154 runs through the canister housing 150 to supply pulsed air to clean the particulates from the surface of the filter element (not shown). A retainer 156 comprising wire screen is located on the top of the housing 150, held on by nuts 160, to retain the media 152 within the housing 150 while still permitting flue gas to flow through the canister. Duck bill valve 158 remains closed during filter operation of the filter system, but opens during cleaning to pass cleaning air through the pulse pipe 154 and to the filter element.

Figure 4:
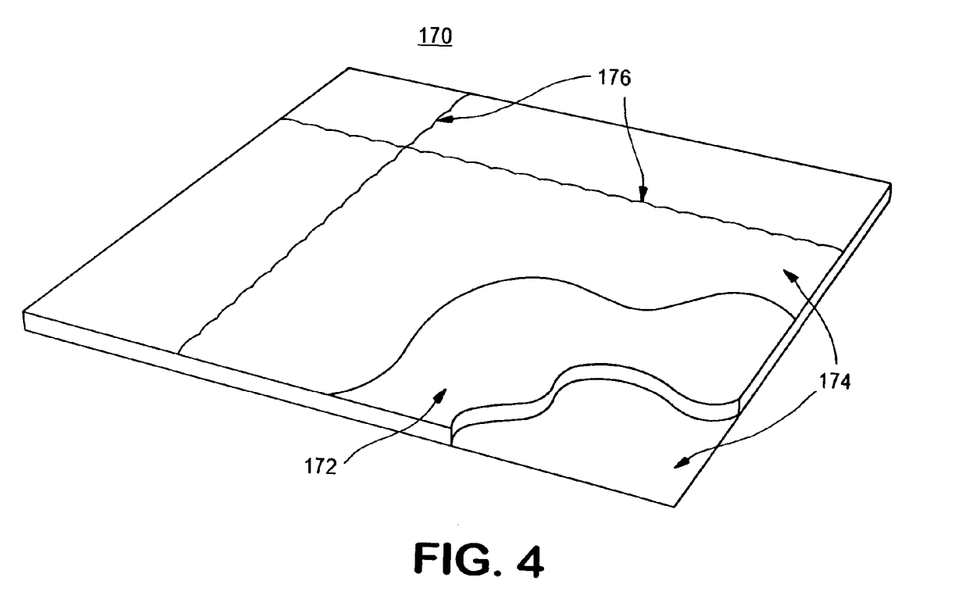
FIG. 4 is a cut-away perspective view of an embodiment of an adsorbent filter media of the present invention.

Referring to FIG. 4, there is shown a section of an adsorbent filter media 170, which comprises an adsorbent component 172, such as felted activated carbon fibers or other air-permeable high surface area support material having binding agent and a promoter thereon, or alternatively a substrate having activated carbon or other air-permeable high surface area support particles with binding agent and promoter thereon imbibed into the structure of the substrate. Optional additional layers 174 are located on either or both sides, as shown, of the adsorbent The layers 174 are attached to the adsorbent component by any suitable means, such as stitching 176, as shown, or lamination, or the like, depending on the requirement of the filtration system. Such a filter media 170 may be formed into a flexible filter insert for location within a filter element, or in an alternative embodiment, the filter media 170 may be formed into a filter element itself, such as a filter bag.

Figure 5:
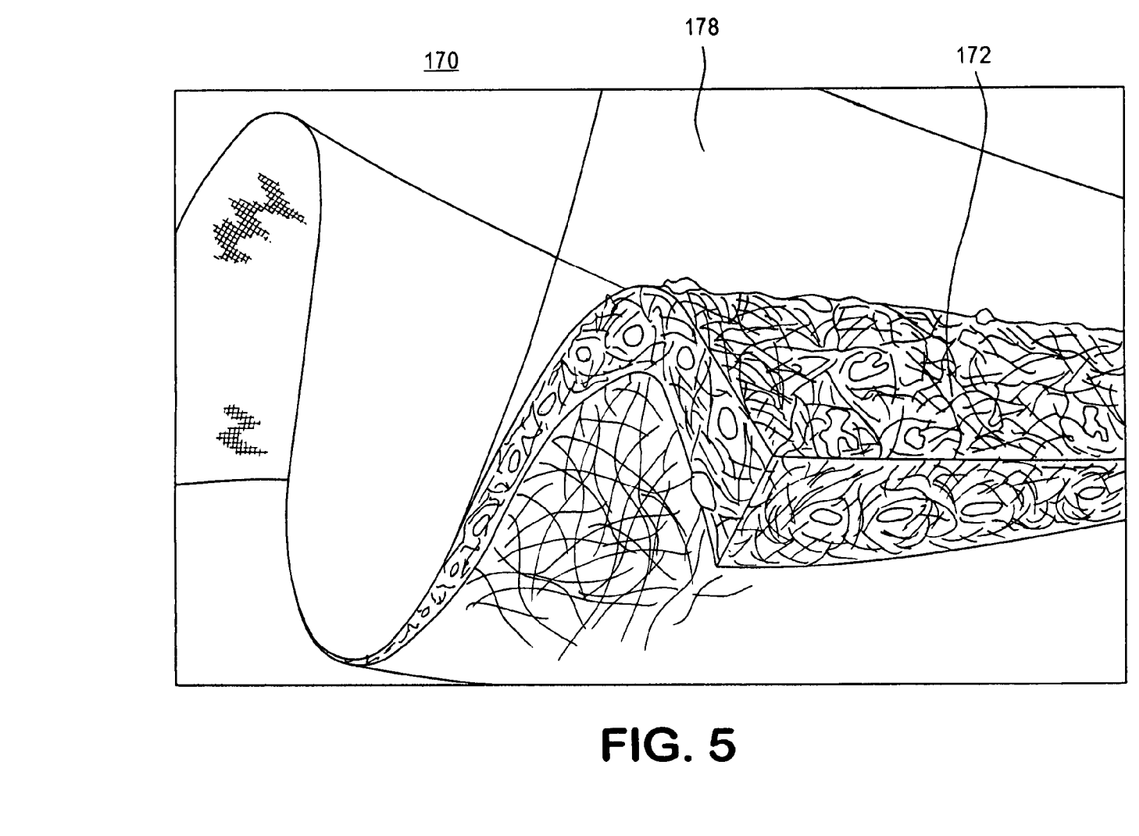
FIG. 5 is a perspective view of a partially separated section of an adsorbent filter media of the present invention.

Referring to FIG. 5, there is shown a perspective view of a partially separated section of an adsorbent filter media 170. The media comprises an adsorbent component comprising, in this embodiment, a felted backer material 172 incorporating a binding agent and promoter and a membrane layer 178. This adsorbent filter media 170 is suitable for formation into a filter element of the present invention, such as a filter bag, pleated filter cartridge, etc., wherein the membrane provides surface filtration of the particles in the flue gas stream and the backer provides downstream mercury removal. While a variety of membrane layers may be employed, it is particularly preferred to employ an expanded PTFE membrane, such as that described in U.S. Pat. No. 3,953,566, to Gore, U.S. Pat. No. 5,476,589, to Bacino, and U.S. Pat. No. 5,814,405, the subject matter of these patents being specifically incorporated by reference herein, due to its exceptional filtration properties. Expanded PTFE (ePTFE) in the form of a membrane has a number of desirable properties which makes it a particularly desirable filtration material. For example, ePTFE has many microscopic holes or "micropores", such as on the order of 0.05 to 10 µm across, which allow fluid molecules to pass through but restrict the passage of particulates, such as fine dust and the like. Additionally, the surface of an expanded PTFE membrane can be readily cleaned of accumulated contaminants, vastly improving the operative life of the filter. Other suitable nonwoven or woven backers materials may also be used. The membrane layer 178 may be attached to the backer, either continuously or discontinuously, such as by means of lamination, welding, sewing, tacking, clamping, or other suitable attachment means.

Figure 6:
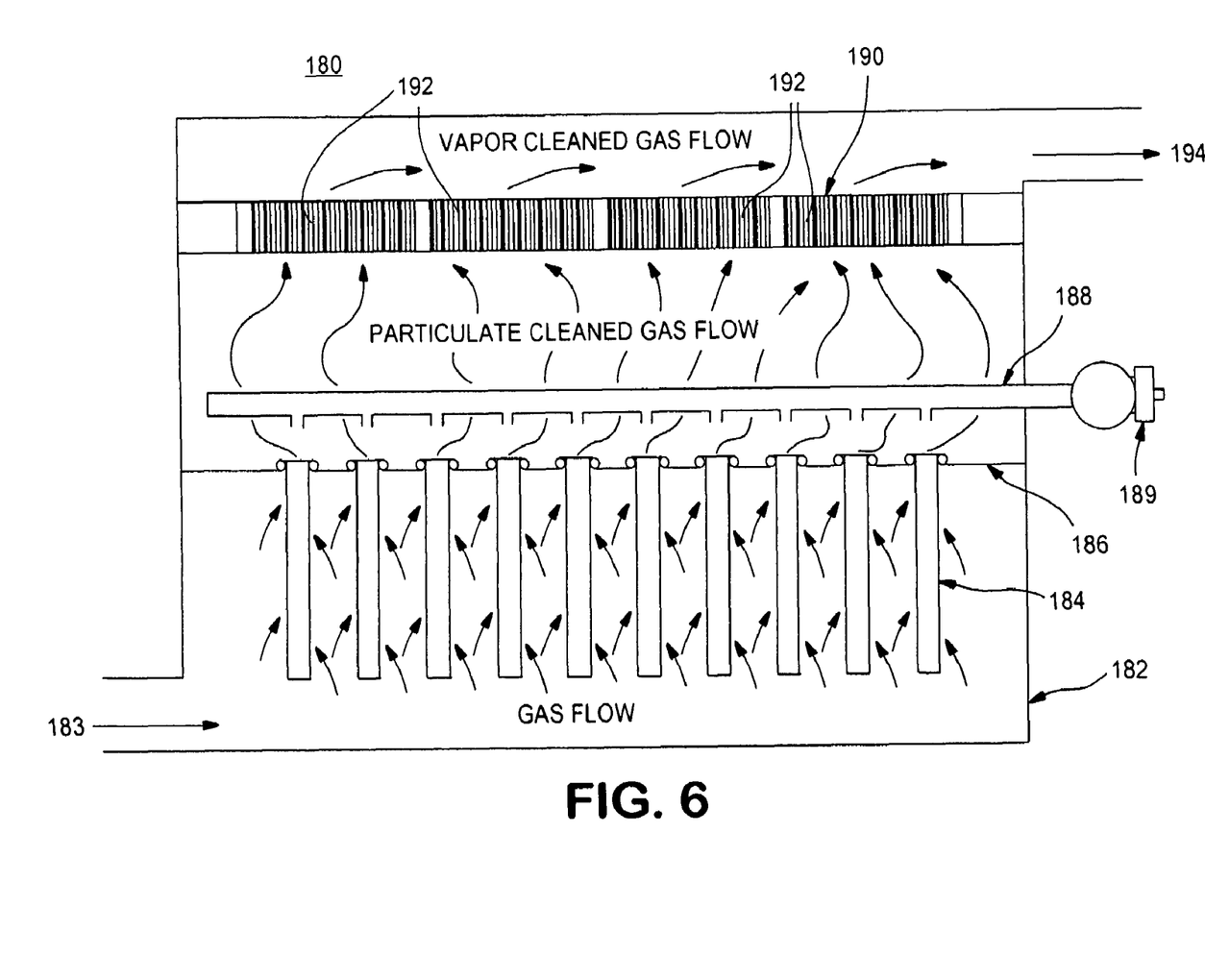
FIG. 6 is a schematic picture of a filter system of the present invention.

Referring to FIG. 6, there is shown an exemplary schematic depiction of a third embodiment of a filtration system 180 of the present invention, wherein an separate adsorbent filter array is located downstream of a baghouse. Particularly, filtration system 180 comprises a baghouse 182 having gas flow inlet 183, filter elements 184 oriented in tube sheet 186, and a pulse cleaning system comprising pulse pipe 188 and pulse valve 189. An adsorbent filter array 190 incorporating adsorbent filter components in the form of pleated panel filters 192 is oriented downstream of the baghouse 182 to remove mercury from the flue gas stream before it passes out of the filter system through outlet 194. Alternative adsorbent filter arrays may be provided in the filtration systems of the present invention, provided they incorporate an adsorbent component comprising an air-permeable high surface area support, a binding agent and a promoter. Moreover, the upstream particulate filter component of the filtration system may comprise any conventional particulate filtration system, such as a baghouse, as described, an advanced hybrid particulate collector system, such as that described in U.S. Pat. No. 5,938,818, to Miller, or any comparable particulate filtration unit.

Test Methods

Bet Method for Surface Area Determination

The BET method, first reported by Brunauer, S., Emmett, P. H., and Teller, E. (1938), *J. Amer. Chem. Soc.* 60, 309, was used to determine apparent surface area from nitrogen adsorption isotherms. Isotherms were measured using a Coulter SA 3100 instrument (Coulter Corp., Miami, Fla.) after outgassing at 300° C. for 8 hours under dynamic vacuum unless stated otherwise.

Mercury Capture Efficiency and Capacity Test

This test is used to measure the efficiency with which small samples of textiles, needle-felted or non-woven fabrics, permeable tapes, and other types of permeable sheet goods used as filters can capture elemental mercury vapor from a hot, flowing gas stream as a function of time under standardized conditions. Total mercury capture (capacity, see definitions below) up to a designated efficiency level (see definitions below) can also be determined. Although the reactor apparatus utilized for these measurements is capable of measuring performance with a variety of gas compositions, temperatures, flow rates, and end-point efficiencies, we have selected a particular parameter set for testing. This test accelerates mercury loading with respect to loading rates experienced under typical field conditions and generates results that can be correlated with performance of the specimens exposed to flue gases in commercial facilities.

Essentially, a flowing gas stream at 300 cm$^3$/min (NTP) consisting of 1 (vol.) ppm of zerovalent mercury vapor 7 to 8 (vol.) percent water vapor, optionally a fraction of oxygen and other flue-gas components, and the balance nitrogen is preheated to 185° C. and passed through a pre-weighed and dried 2.54 cm diameter disk of porous sample mounted orthogonally to the direction of flow of gas and held isothermally at 185° C. such that gas is distributed uniformly radially across the plane of fabric and moved through the fabric in a plug-flow manner. The incident mercury concentration is held constant throughout the run by the mercury generation section of the apparatus using NIST traceable fixed-rate mercury permeation tubes held at constant temperature. The concentration of mercury in the emerging gas stream (outlet) is determined repeatedly (semi-continuously) with a pre-calibrated, on-line detector after the gas stream is conditioned to remove water vapor, to reduce any oxidized mercury to the zero-valent state, and to dilute the mercury to the concentration range of greatest analytical sensitivity of the detector. To enable measurement of the incident (inlet) concentration of mercury periodically, a piping pathway to bypass the test specimen can be selected by appropriate valve configuration in the apparatus. Efficiency, defined below, is computed repeatedly during the test corresponding to each point of time-on-stream of the specimen. When efficiency falls below a predetermined target, usually 40%, the test is terminated, the total time on-stream to that point determined, and the total mercury adsorbed (capacity, defined below) to that point computed by integrating the amount of mercury in the emerging stream over the entire run to the end point and subtracting this quantity from the computed steady-state incident cumulative challenge amount. The sample is then removed, weighed, and optionally independently analyzed for speciated mercury content by a destructive wet analytical method known as the Ontario Hydro method, ASTM D22.03.01, described below. A separate aliquot of representative virgin fabric specimen is tested for air permeability using a separate test known as the Frazier test, described below. Mercury material balances throughout the reactor and particularly around the reactor analytical system and the mercury generation system frequently are corroborated against the Ontario Hydro method, described below, using a 3 hour sampling time and the mini-impinger option of the method. The equipment and piping path of the test apparatus is described below.

Figure 7:
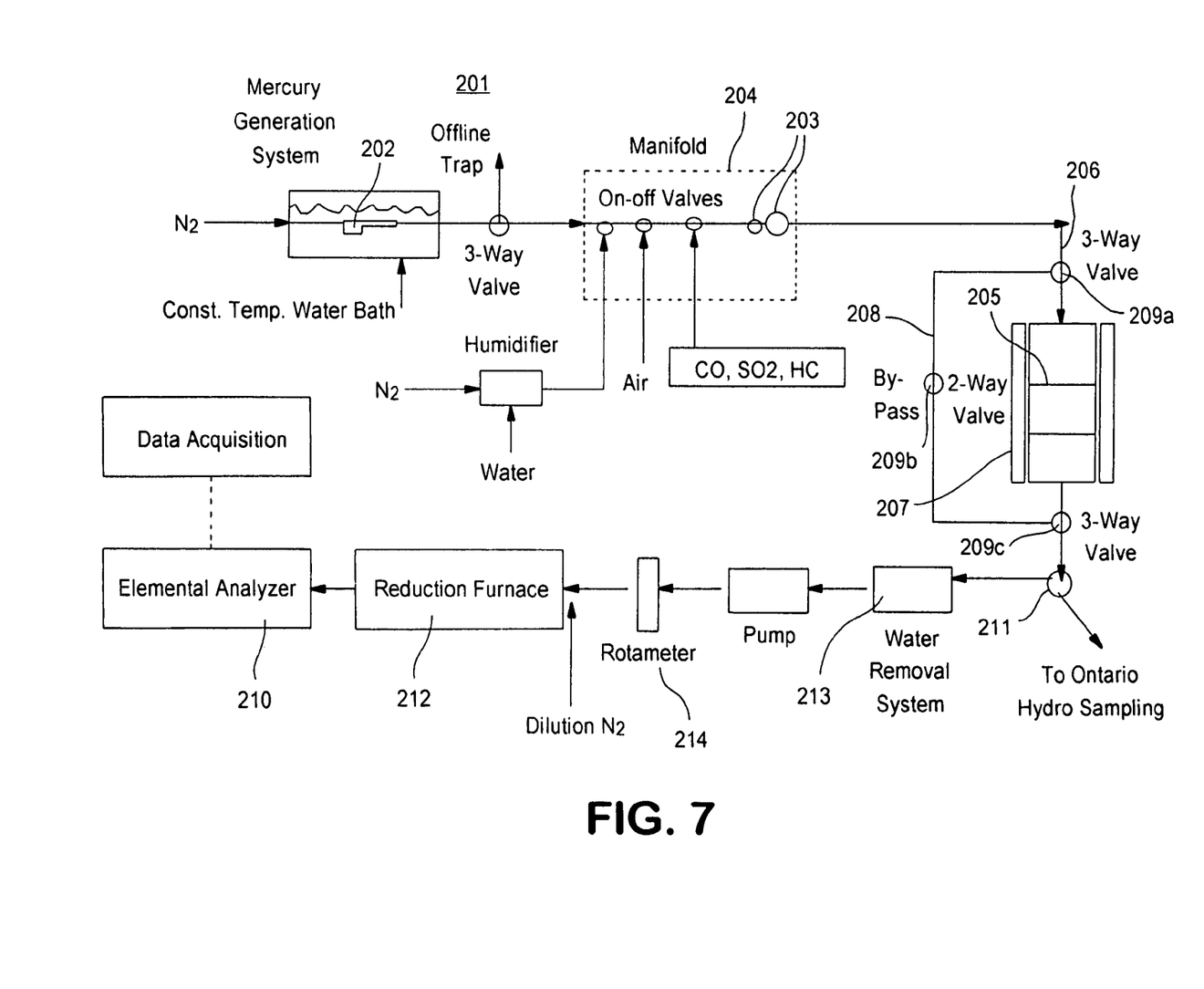
FIG. 7 is a perspective view of a test apparatus utilized in connection with the present invention.

Referring to FIG. 7, the mercury generation system 201 is based on a VICI Metronics 10 cm mercury permeation tube 202 which delivers 1980 mg Hg/minute at 100° C. Optional pressure gauge 203 may be attached to a port of the manifold 204. Gases are passed from the manifold 204 to a foresection of the reactor 205 which is packed and heated to pre-mix and pre-heat the inlet gases to about 180° C., at 300 cm$^3$/min, NTP. The reactor holder (not shown) consists of a stainless steel outer housing which disassembles into two pieces of precisely machined and matched flanged fittings housing a fluoropolymer clamping system that defines a precisely cut 2.54 cm diameter circular disk of filter medium exposed to the gas stream. The fluoropolymer holder seals to a lip cut in the stainless steel outer housing, which, in turn, screws together to make a gas tight seal around the test piece. A matching punch cutter is used to cut a test piece of precise dimensions to fit the sample holder; the cut filter test piece is placed in a constant humidity chamber then weighed prior to installation in the holder. A thermocouple (not shown) measures the filter temperature through a threaded side port. The inlet piping 206 to the reactor 205 is heat traced and the reactor 205 itself is housed in an isothermal oven 207 held at 185±1° C. A bypass line 208 is constructed with valving (209a, 209b, 209c) to isolate the reactor 205 while still allowing inlet gas to flow to the detector 210. A valve 211 in the line leading from the reactor 205 contains a sampling port for optional Ontario-Hydro testing via an external glass train (not shown). (The valve 211 diverts the normal flow path downstream of the reactor when such Ontario-Hydro testing is carried out.) In the normal flow path for on-line mercury analysis, the effluent gas from the reactor 205 is channeled to a water removal system 213 that consists of a countercurrent flow air dryer that contains a 10 foot Nafion™ tube from Permapure Company. Next in line is reduction furnace 212 held at 920° C. through which the gas residence time is 2.5 seconds. Independent tests of the mercury reduction furnace and water removal system showed no hold up of and complete reduction of mercury. Effluent from the drying system contains less than 0.1% water. After passage through a calibrated rotameter 214, dilution nitrogen is added to the stream, 1000 cm$^3$/min NTP, prior to the gas stream moving to the analyzer section 210. The analyzer 210 is a Buck Scientific Company Model 400A Mercury Analyzer which utilizes ultraviolet detection at 254 nm through a quartz cell to detect elemental mercury. The span range of the analyzer output is inspected and adjusted if necessary each time the reactor system is taken off-line. Data acquisition is accomplished using Strawberry Tree software and appropriate computer interface boards. All tubing or wetted parts in the system are either constructed of polytetrafluoroethylene, glass, or, minimally, stainless steel.

Ontario-Hydro Test

This test method is used to measure precise concentration of mercury species in the gas stream in both elemental and oxidized forms and to analyze mercury content of solid sorbents after HF digestion. The method is ASTM Method D22.03.01 of the Task Group for Elemental and Oxidized Mercury entitled "ASTM Standard Test Method for Elemental, Oxidised, Particle-Bound and Total Mercury in Flue Gas Generated from Coal-Fired Stationary Sources. (The Ontario-Hydro Method)", Z6590Z, adopted by D22.03.01 Task Group for Elemental and Oxidized Mercury, issued 2002, in press. The mini-impinger (25 ml) option is followed to analyze gas stream from the reactor using a 3 hour sampling time. Analysis of irreversibly trapped mercury by filter systems using the on-line method (not limited to 40% mercury capture efficiency) and the Ontario-Hydro analysis of HF-digested samples generally agree to ±20%.

Definition of Terms

"MERCURY CAPTURE EFFICIENCY PERCENTAGE," or "MCEP", is defined as the instantaneous volume fraction of incident (inlet) mercury that is removed (adsorbed) by the test specimen under reaction conditions described above, expressed as a percent and inferred by the difference between inlet and outlet gas stream mercury concentrations:

$$MCEP=\{(100)\times[(\text{Instantaneous inlet gas stream mercury concentration})-(\text{Instantaneous outlet gas}$$

stream mercury concentration)]/[(Instantaneous inlet gas stream mercury concentration)]}

In a test in which fast digital electronic data gathering techniques are used throughout the run, it is convenient to gather MCEP data over finite, short time intervals during which the change in outlet mercury concentration with time can be considered negligible.

Mercury capture efficiency can be normalized to thickness of the mercury filter test piece or to pressure drop or resistance to axial gas flow through the filter as measured by a standard test conducted on a separate test piece of similar fabric or filter composition.

fixture was connected to a flow meter in line with a source of dry compressed air. The downstream side of the sample fixture was open to the atmosphere.

Testing was accomplished by applying a pressure of 0.5 inches of water to the upstream side of the sample and recording the flow rate of the air passing through the in-line flowmeter (a ball-float rotameter).

Results are reported in terms of Frazier Number, which is air flow in cubic feet/minute/square foot of sample at 0.5 inches water pressure.

Without intending to limit the scope of the present invention, the following examples illustrate how the present invention may be made and used:

TABLE 1

High Temperature Mercury Capture Capacity and Efficiency Test Results from Examples 1–11

| Example | Substrate | mass % Binding Agent | mass % Promoter, dehydrated | Dynamic Mercury Trapping Test Temperature (° C.), additional gas components | Dynamic Mercury Trapping Test Results, MCC40 (mg Hg/g untreated test piece) |
|---|---|---|---|---|---|
| 2 | (Control) ACF | 0 | 0 | 185 | 0.27 |
| 1 | ACF | 40.7% KI | 11.2% $Zn(CH_3CO_2)_2$ | 185 | 36.6 |
|   |   |   |   | 185, $O_2$ | 46.2 |
| 3 | ACF | 48.6% KI | 0 | 185 | 25.8 |
| 4 | ACF | 0 | 16.8% $Zn(CH_3CO_2)_2$ | 185, $O_2$ | 0.04 |
| 5 | ACF | 48.6% KI | 3% $Zn(CH_3CO_2)_2$ | 185 | 30.1 |
|   |   |   |   | 185, $O_2$ | 30.0 |
| 6 | ACF | 38.4% KBr | 14.8% $Zn(CH_3CO_2)_2$ | 185, $O_2$ | 6.2 |
| 7 | ACF | 20.2% KBr | 56.2% $K_4P_2O_7$ | 185, $O_2$ | 2.9 |
| 10 | C-filled ePTFE felt | 19.8% KI | 0 | 185 | 8.6 |
| 11 | (Control) C-filled ePTFE felt | 0 | 0 | 185 | 0.002 |

"MERCURY CAPTURE CAPACITY TO 40% EFFICIENCY", or "MCC40", expressed in mg Hg/g sample, is defined as the total accumulated milligrams of mercury adsorbed per pre-test, humidity-equilibrated grams of sample weight, by a test specimen held under the test conditions described above, from the beginning of the test until MCEP decays to 40%.

In a test in which digital electronic data gathering techniques are used such that data are gathered within an unbroken stream of short time periods with negligible dead time between measuring intervals, i.e., continuous batching of sampling intervals techniques, integration to compute accumulated mercury adsorbed over the test period may be simulated by finite summations $$MCC40 = \Sigma_{MCEP=initial\%}^{MCEP=40\%} A$$

Where A={[(Incremental steady-state inlet Hg challenge, expressed as mg of Hg/second)×(Seconds duration of sampling interval)]−[(Incremental outlet Hg amount, expressed as mg of Hg/second)×(Seconds duration of sampling interval)]}/(grams, pre-test humidity-equilibrated weight of sample)]

Frazier Test

The standard test for resistance to axial gas flow is the Frazier air flow test, which reports flow in cubic feet per minute per square foot of material.

Air permeability was measured by clamping a test sample in a gasketed flanged fixture which provided in circular area of approximately 6 square inches (2.75 inches diameter) for air flow measurement. The upstream side of the sample

EXAMPLE 1

A 4 inch by 6 inch section of VAF-90 activated carbon felt (ACF) was cut from a large sheet of material obtained from Shanghai No.1 ACF Company Co., Ltd. (Shanghai, China) and weighed precisely. As received, the material had a nominal mass-per-unit-geometric-area of 260 g $m^{-2}$ and a measured Frazier Number air permeability of about 60-65. The cut sample was placed on a platen heated to about 90° C., slightly dampened with 2-propanol, and impregnated using an aerosol sprayer under atmospheric conditions. The sample was treated on both sides until wet through but not dripping with an aqueous solution of 1.0 F potassium iodide and 0.27 F zinc acetate dihydrate. The wet sample was placed on a stainless steel screen in a solvent-vented muffle furnace held at 200° C. for about one hour, cooled and equilibrated for 2 hours, then weighed. The dried sample displayed an air permeability of about 52-60 Frazier. A small portion was sent to Galbraith Laboratories, Inc. in Knoxville, Tenn., USA for chemical analysis of percent iodine, zinc, and loss on drying. Another portion of the sample was tested by a thermogravimetric method for weight loss on heating in air at 20° C./minute to 250° C. and held for 4 hours. This and similar samples were examined by optical microscopy and by spectroscopic methods. A portion of the sample was tested using the High Temperature Mercury Adsorption Capacity and Efficiency Test, as described infra, using a reactor facility at the US Environmental Protection Agency Laboratories in North Carolina, USA. Results from this test and corresponding analyses are listed in Table 1.

EXAMPLE 2 (COMPARATIVE)

A sample of ACF felt was wet with distilled water, dried, and treated similarly to the material described in Example 1 except for the impregnation step. This material was subjected to the high temperature mercury adsorption capacity and efficiency test as a control sample. Results from this test are listed in Table 1.

EXAMPLE 3

A sample was prepared similarly to the procedure of Example 1 except that no zinc and a slightly higher loading of potassium iodide were added. Composition and results of testing in the High Temperature Mercury Adsorption Capacity and Efficiency Test appear in Table 1.

EXAMPLE 4

A sample was prepared similarly to the procedure of Example 1 except that no potassium iodide was added and a higher zinc loading was achieved. This sample was tested in the high temperature mercury adsorption capacity and efficiency test. Results appear in Table 1.

EXAMPLE 5

A sample was prepared similarly to the procedure of Example 1 except that a higher potassium iodide loading and a lower zinc acetate loading were added. This sample was tested in the high temperature mercury adsorption capacity and efficiency test. Results appear in Table 1.

EXAMPLE 6

A sample was prepared similarly to the procedure of Example 1 except that potassium bromide was used in place of potassium iodide and that a slightly higher zinc acetate loading was added. This sample was tested in the high temperature mercury adsorption capacity and efficiency test. Results appear in Table 1.

EXAMPLE 7

A sample was prepared similarly to the procedure of Example 6 except that a lower loading of potassium bromide was added and potassium pyrophosphate was used in place of zinc acetate at a substantially higher loading. Test results using this sample in the High Temperature Mercury Adsorption Capacity and Efficiency Test are reported in Table 1.

EXAMPLE 8

A sample was prepared by the procedure of Example 1 using a square 1.5 meter×1.5 meter piece of VAF-110 ACF in place of VAF-90 ACF. The VAF-110 displayed a nominal mass-per-unit-geometric-area of 380 $gm^{-2}$. The dried sample of impregnated ACF was then sewn to the felt side of a layer of Remedia™ Catalytic Filter Membrane-Felt Laminated composite produced by W.L. Gore and Associates, Inc. (Newark, Del.) then subjected to catalytic efficiency testing and to Frazier air permeability measurements.

EXAMPLE 9

A large sample of ACF from Shanxi Xinshidai Import & Export Corporation, (Taiyuan, Shanxi, China) Import Company that was 5 millimeters thick and displayed a BET surface area of 1123 $m^2.g^{-1}$ was dampened with 2-propanol then impregnated to incipient wetness with an aqueous solution of hot zinc acetate. The sample was partially air dried then heat treated at 220° C. for about 17 hours. After cooling, the sample was impregnated with aqueous potassium iodide solution to the point of dripping then rolled with a plastic cylinder to remove excess moisture. After drying at 110° C., the sample was further heat treated overnight at about 200° C., cooled, then portions subjected to various tests. Among these was exposure to elemental mercury vapor and air in a sealed polytetrafluoroethylene-lined autoclave held at 190° C. for 9 hours under autogeneous pressure followed by cooling under mercury vapor. The mercury-treated sample was handled aerobically and transferred to a temperature-programmed-oxidation apparatus that had been interfaced with a quadrupole mass spectrometer as a detector. No significant emission of methylmercury above the parts-per-million range detection level was observed as the sample was heated in a mercury-free stream of helium and monitored by mass spectrometry.

EXAMPLE 10

Activated carbon-filled PTFE fibers were prepared as described in U.S. Pat. No. 5,620,669 with the replacement of powdered catalyst with a sufficient weight of activated carbon powder to result in a final loading in the range of 40-46 percent by weight carbon. The activated carbon used was a coconut based carbon obtainable from Barnaby Sutcliff Company, milled to an average particle size of about 1 micron or finer. Resulting composite fibers averaged 0.51 g/denier with a tenacity average of 28,000 denier. These low tenacity fibers were chopped to either 1.5 inch or 2 inch lengths, air blown, and mechanically carded using a multi-roller pilot-scale machine, then needled into a PTFE scrim from both sides. The resulting structure was a uniform felt of 25.8 ounces-per-square-yard that displayed a permeability of 39 Frazier. The formed felt was heat-treated at 200° C. for 30 minutes, without use of a pin frame, to preshrink and tighten the structure. The heat finished felt displayed an air permeability of 14 Frazier and a BET surface area of 99 $m^2g^{-1}$ using nitrogen adsorbate. A portion of this felt was pre-moistened with 2-propanol then impregnated with an aqueous solution of potassium iodide followed by drying at 110° C. and heat treatment at 190° C. Results of the High Temperature Mercury Adsorption Capacity and Efficiency Test are reported in Table 1 along with potassium iodide loading.

EXAMPLE 11 (COMPARATIVE)

A portion of the activated-carbon-filled ePTFE felt prepared in Example 10 without potassium iodide treatment was used as a control in the High Temperature Mercury Adsorption Capacity and Efficiency Test. Results are reported in Table 1.

EXAMPLE 12

A mercury trapping filter insert was prepared by combining two layers of 1.4 $oz/yd^2$ woven e-glass, style 1080 from JPS Glass, (Slater, S.C.) with a middle layer of VAF 90 activated carbon felt from Shanghai No.1 ACF Co., Ltd, (Shanghai, China). The three 42 inch by 180 inch layers were quilted together on a long-arm quilting machine, from Gammill Quilting Machine Company (West Plains, Mo.), using 1200 DENIER RASTEX@ sewing thread from W. L. Gore & Associates, Inc. (Elkton, Md.). The layers were stitched together in horizontal and vertical lines, spaced 3 inches apart to form 3 inch squares. The quilted filter insert was cut into a smaller sample measuring 13.25 inches by 36 inches. This piece then was treated in a shallow tray by pouring onto it a hot solution of 1.0 F potassium iodide and 0.27 F zinc acetate dihydrate to incipient wetness. The lightly-moistened mat was hung in a large air-circulated oven at approximately 200-260° C. overnight. After drying, it was formed into a 3.8 inch diameter×34 inch tube and sewn with a triple stitch using the same type of 1200 denier thread as was used for the quilting process. The dried sample contained 21.3% by mass potassium iodide and 8.2% zinc acetate, (including the mass of the fiberglass reinforcement).

The filter insert sleeve was pulled over a perforated spiral formed metal tube made from 304 stainless steel, supplied by Arcor Inc. (Chicago, Ill.). The tube material was 0.014 inches thick with an outside diameter of 3.4 inches. The perforated hole pattern was 0.125×0.188 inches, staggered, with an open area of 33%. The filter insert, supported by the metal tube was then inserted into a 10 wire, carbon steel filter bag cage with an outside diameter of 4.5 inches, supplied by Royal Wire Products, Inc. (North Royalton, Ohio). The entire assembly was then inserted into a 34 inch long filter bag, constructed from 16 oz./yd$^2$ polyphenylene sulfide needlefelt, laminated with GORE-TEX® membrane from W.L. Gore & Associates, Inc. (Elkton, Md.).

EXAMPLE 13

A 16 foot length of 17 inch wide ACF mat weighing 710 grams was unfurled onto a shallow trough molded from aluminum foil then wet thoroughly with about 7 liters of a hot solution of 0.7 F potassium iodide and 0.15 F zinc acetate dihydrate. The wetted mat was formed into a lengthwise 4 inch diameter cylinder with approximately 3 inch wall overlap around a stainless-steel wire support cage used as a form. The aluminum foil of the trough then was tightly wrapped over the formed tube to hold the mat in the cylindrical shape while drying. Holes were poked into the foil wrapping to allow for moisture release and the form-fitted mat placed into a large air-circulated oven at approximately 200-260° C. overnight. The stiffened, dry prototype was carefully unwrapped and removed from the wire cage form. A small piece was cut for mercury capture capacity testing from the end of the cylinder and the rest inserted into an 18 foot PVC pipe. The pipe containing the ACF mat cylinder, in turn, was inserted into a wire cage/filter bag assembly, and the pipe carefully withdrawn, leaving behind the free-standing ACF insert within the filter bag internal cage. The entire membrane bag/cage/insert assembly was installed into a pulse test apparatus and fitted with accelerometers and flow and pressure transducers along its length. Simulated pulse cleaning, pressure drop, and durability tests were then performed on the prototype assembly. Test results were compared to those derived using the filter bag assembly without the ACF mercury-trapping insert.

EXAMPLE 14

A 17 inch by 120 inch section of VAF-90 activated carbon felt (ACF) was cut from a large sheet of the material obtained from Shanghai No.1 ACF Company Co., Ltd. (Shanghai, China). The sample was treated with a hot solution of 0.7 F potassium iodide and 0.15 F zinc acetate dihydrate, according to the procedure described in Example 13. The wetted mat was folded into 5 pleats that were 12" deep. The treated sample was placed into a large air-circulated oven at approximately 200-260° C. to dry overnight. The stiffened, pleated prototype was removed from the oven and inserted into a pleated support structure made from 20 gauge, Type 304 Stainless Steel from Spantek/Coastal Division of U.M.1, (Summer-field, N.C.). Gravimetric binder and promoter loading computed for the dried sample was 40.7 mass % potassium iodide and 11.2 mass % zinc acetate, anhydrous basis.

While particular embodiments of the present invention have been illustrated and described herein, the present invention should not be limited to such illustrations and descriptions. It should be apparent that changes and modifications may be incorporated and embodied as part of the present invention within the scope of the following claims.

We claim:

1. A non-aqueous, dry, solid state adsorbent composition for the capture and binding of elemental and oxidized mercury pollutants carried in a gas stream, said composition comprising:
   a binding agent comprising at least one binding compound having a component selected from the group consisting of an anion of a halide, an anion of a thiocyanate, an anion of a sulfide, an anion of a polysulfide, an anion of selenium, an oxyanion of selenium, an anion of tellurium, an oxyanion of tellurium, an anion of phosphorous, and an oxyanion of phosphorous; and
   a promoter compound having a component selected from the group consisting of a multivalent metallic cation and a multivalent metalloid cation, said promoter compound having a standard aqueous reduction potential Emf value at 25° C. less than −0.56 volts,
   wherein said composition is capable of chemical reaction with elemental and oxidized mercury to bind said elemental and oxidized mercury.

2. The composition of claim 1, wherein said promoter compound comprises at least one material selected from the group consisting of a carboxylate salt of Zn(II) and a carboxylate salt of Mg(II).

3. The composition of claim 1, wherein said binding agent comprises at least one compound selected from the group consisting of potassium iodide, copper iodide, zinc iodide and copper thiocyanate.

4. The composition of claim 1, wherein said binding agent comprises potassium iodide and said promoter comprises zinc acetate.

* * * * *